United States Patent
Wu et al.

(10) Patent No.: US 11,747,517 B2
(45) Date of Patent: Sep. 5, 2023

(54) SKY MONITORING SYSTEM

(71) Applicant: Ecole Polytechnique Federale De Lausanne (EPFL), Lausanne (CH)

(72) Inventors: Yujie Wu, Ecublens (CH); Jérôme Henri Kämpf, Corcelles-Près-Concise (CH); Jean-Louis Scartezzini, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 237 days.

(21) Appl. No.: 16/636,671

(22) PCT Filed: Aug. 5, 2018

(86) PCT No.: PCT/IB2018/055889
§ 371 (c)(1),
(2) Date: Feb. 5, 2020

(87) PCT Pub. No.: WO2019/030639
PCT Pub. Date: Feb. 14, 2019

(65) Prior Publication Data
US 2021/0149080 A1 May 20, 2021

(30) Foreign Application Priority Data
Aug. 5, 2017 (DE) .................. 10 2017 007 333.3

(51) Int. Cl.
*G01W 1/12* (2006.01)
*H04N 13/239* (2018.01)
(Continued)

(52) U.S. Cl.
CPC ............. *G01W 1/12* (2013.01); *G03B 17/565* (2013.01); *H04N 13/239* (2018.05); *H04N 23/698* (2023.01); *H04N 25/772* (2023.01)

(58) Field of Classification Search
CPC ... G01W 1/12; G03B 17/565; H04N 5/23238; H04N 5/37455; H04N 13/239; H04N 5/225; G01J 2001/4266
See application file for complete search history.

(56) References Cited

U.S. PATENT DOCUMENTS

| 6,614,481 B1 | 9/2003 | Sasaki |
| 9,007,460 B2 | 4/2015 | Schmidt et al. |

(Continued)

FOREIGN PATENT DOCUMENTS

| CN | 102088545 A | 6/2011 |
| CN | 206004768 U | 3/2017 |

(Continued)

OTHER PUBLICATIONS

International Search Report and Written Opinion for PCT/IB2018/055889 dated Nov. 14, 2018 (10 pages).

(Continued)

*Primary Examiner* — Lin Ye
*Assistant Examiner* — Tuan H Le
(74) *Attorney, Agent, or Firm* — Taft Stettinius & Hollister LLP; Stephen F. Rost (57) ABSTRACT

In a sky monitoring system, comprising an image sensor, a wide-angle lens, a microprocessor, and a memory unit, wherein the sky monitoring system is configured to take pictures of a sky scene, wherein the sky monitoring system is configured to subdivide each picture of the sky scene into a group of patches and to determine one luminance value for each patch, wherein the sky monitoring system is configured to calculate an output based on the luminance values of the patches, the image sensor, the wide-angle lens, the microprocessor and the memory unit are integrated into one single sky monitoring device thus making the sky monitoring system an embedded system.

20 Claims, 4 Drawing Sheets

(51) Int. Cl.
     *G03B 17/56*    (2021.01)
     *H04N 23/698*   (2023.01)
     *H04N 25/772*   (2023.01)

(56) References Cited

U.S. PATENT DOCUMENTS

| | | | |
|---|---|---|---|
| 9,565,377 B2* | 2/2017 | Hamann | G06T 5/008 |
| 2004/0169770 A1 | 9/2004 | Widener et al. | |
| 2010/0139105 A1 | 6/2010 | MacDonald | |
| 2010/0309330 A1* | 12/2010 | Beck | G01W 1/10 |
| | | | 348/222.1 |
| 2012/0257008 A1 | 10/2012 | Taylor | |
| 2014/0083413 A1 | 3/2014 | Bibi et al. | |
| 2016/0269630 A1* | 9/2016 | Chiou | G01J 1/0418 |
| 2016/0273726 A1* | 9/2016 | Adler | H05B 45/12 |
| 2017/0031056 A1 | 2/2017 | Vega-Avila | |
| 2018/0136366 A1* | 5/2018 | Vega-Avila | H02S 40/00 |
| 2020/0260556 A1* | 8/2020 | Rozbicki | F21V 23/0464 |

FOREIGN PATENT DOCUMENTS

| | | |
|---|---|---|
| DE | 102009024212 A1 | 12/2010 |
| EP | 2891904 A1 | 7/2015 |
| JP | 2015021882 A | 2/2015 |
| WO | 2015104281 A1 | 7/2015 |

OTHER PUBLICATIONS

Ignacio Luque-Heredia et al: "A Sun Tracking Error Monitor for Photovoltaic Concentrators", Conference Record of the 2006 IEEE 4th World Conference on Photovoltaic Energy Coversion (IEEE Cat. No. 06CH37747), IEEE, May 1, 2006; pp. 706-709; XP031007402; ISBN: 978-1-4244-0016-4.

Le Roux W G Ed—Li Baizhan et al: "Optimum tilt and azimuth angles for fixed solar collectors in South Africa using measured data", Renewable Energy, Pergamon Press, Oxford, GB, vol. 96, May 14, 2016 (May 14, 2016), pp. 603-612, XP029572907, ISSN: 0960-1481, DOI: 10.1016/J.RENENE.2016.05.003.

* cited by examiner

SKY MONITORING SYSTEM

CROSS-REFERENCE TO RELATED APPLICATIONS

This application is a national stage of, and claims priority to, Patent Cooperation Treaty Application No. PCT/IB2018/055889, filed on Aug. 5, 2018, which application claims priority to German Application No. DE 10 2017 007 333.3, filed on Aug. 5, 2017, which applications are hereby incorporated herein by reference in their entireties.

TECHNICAL FIELD

This disclosure relates to a sky monitoring system.

BACKGROUND

Maximizing the use of daylight has become a trend in the design of buildings to minimize the need for artificial lighting which consumes electrical energy. At the same time, building occupants' visual comfort and non-visual health can be improved by using more daylight in buildings. The proliferation of lighting simulation is playing a significant role in building design, lighting performance analysis and engineering aspects of architecture. Particularly in the estate refurbishing industry, there is a strong demand from customers in the visualisation of semi-real lighting of the interior. Nonetheless, most daylight simulations are traditionally based on unelaborated assumptions of the sky, weather or environmental conditions instead of field measurement. These assumptions in many ways contribute to noticeable bias.

In general, for using lighting simulation in architectural design and building automation, rigid requirements on accuracy and time response are to be met. In addition, the general method of assuming standard skies in lighting simulation may lead to substantial mismatch compared to realistic conditions.

The quality of daylight simulations can be improved by real-site monitoring of sky conditions. Nonetheless, the real-site monitoring is limited to the dynamic range of a device to cover both the sky and ambient objects, as the difference between the luminance of the sun (about $1.6 \times 10^9$ cd/m$^2$) and that of objects in shadow (10-100 cd/m$^2$) is tremendous. Apart from this, the resolution of the sky patches (into which a recorded sky is typically subdivided) and the time consumption for bulky computation are among the many factors challenging the real-site lighting simulation.

The high-dynamic range (HDR) imaging technique, in recent years, has been elucidated to be viable as an apparatus for photometric measurement. However, existing systems still have problems to cover the wide luminance range requirement in outdoor applications (>150 dB) for monitoring the sun and ambient objects at the same time. Furthermore, available HDR image sensors are quite expensive and bulky.

SUMMARY

It is the object of the disclosure to solve or to at least diminish the above-mentioned disadvantages. In particular, it is the object of the disclosure to provide a possibility for flexible monitoring of sky conditions in real time and to use these monitoring results for daylight simulation while keeping the cost for the monitoring as low as possible and while making the monitoring as simple as possible.

The disclosure comprises a sky monitoring system, comprising an image sensor, a wide-angle lens, a microprocessor, and a memory unit, wherein the sky monitoring system is configured to take pictures of a sky scene, wherein the sky monitoring system is configured to subdivide each picture of the sky scene into a group of patches and to determine one luminance value for each patch, wherein the sky monitoring system is configured to calculate an output based on the luminance values of the patches, and wherein the image sensor, the wide-angle lens, the microprocessor and the memory unit are integrated into one single sky monitoring device thus making the sky monitoring system an embedded system.

In this context, the term "sky scene" shall be understood as a view of a sky dome, possibly comprising elements of clear sky and/or elements of cloudy sky and/or the sun and/or surrounding elements of landscape such as buildings, trees and the like. The term "patch" is to be understood as a number of pixels. In a particular embodiment, each patch has only one pixel. In other words: the luminance for each pixel of a sky scene is determined in this particular embodiment. The term "calculate" shall preferably mean high-level computations such as ray-tracing analysis for example. The expression "embedded system" may for example refer to all components of the device being integrated into or attached to a common printed circuit board (PCB).

The fact that all components of the sky monitoring system are integrated in one single sky monitoring device which is configured to undertake onboard lighting calculation leads to a highly flexible and transportable sky monitoring system which does not need additional external components and which can make use of standard components, thus keeping the cost low.

In a typical embodiment, the sky monitoring system is configured to supply as output a rendering image of an illumination scene inside a building and/or an illuminance map of a surface inside the building and/or a current sky condition and/or a current solar intensity and/or a current solar position. These types of outputs have the advantage that the outputs can be directly used for photo-realistic rendering in lighting simulation applications, for lighting control in buildings and/or for solar tracking, for example in photovoltaic (PV) applications.

In a typical embodiment, the image sensor is a CMOS image sensor, wherein the CMOS image sensor preferably comprises between 3 million and 7 million pixels, preferably between 4 million and 6 million pixels, more preferably approximately 5 million pixels, wherein the CMOS image sensor preferably features a signal-to-noise ratio between 20 dB and 60 dB, preferably between 30 dB and 50 dB, more preferably between 35 dB and 45 dB, most preferably approximately 38.1 dB, wherein the CMOS image sensor preferably features a 12-bits analog-to-digital converter, wherein the CMOS image sensor is preferably adapted to operate between −40° C. (Celsius) and 80° C., preferably between −30° C. and 70° C. The use of such a CMOS sensor has the advantage of keeping the cost for the image sensor comparably low while assuring a good functionality.

In a typical embodiment, the wide-angle lens has a focal length between 1 mm and 4 mm, preferably between 2 mm and 3 mm, more preferably approximately 2.5 mm. In this context, the term "approximately" is to be understood as "with a maximum tolerance of +/−10%". The same definition of the term "approximately" shall apply throughout the entire specification, in particular in the foregoing and the following. It has been determined that a focal length in this range can help to ensure that the field of view (FOV) of the imaging system covers a major area of the sky dome and surrounding landscape while distortion effects are kept to a minimum.

In a typical embodiment, a short-pass filter and a long-pass filter are arranged between the wide-angle lens and the image sensor. In this manner, a V(λ)-correction can be obtained.

In a typical embodiment, the sky monitoring system comprises an opaque shield configured to be positioned in a closed position between the lens and a sun in order to shield the lens and the image sensor from the sun, wherein the sky monitoring system preferably comprises a motor, for example a micromotor or step motor, configured to automatically open the opaque shield at a moment of image capturing and to close the opaque shield thereafter. Such a moveable opaque shield has the advantage of protecting the optical system and in particular the image sensor from prolonged direct sun exposure and thus from overheating and damage. As an alternative to an opaque shield, a shutter can be used. Compared to a shutter, the opaque shield has the advantage to be simple in construction and highly reliable.

In a typical embodiment, a maximum opening time of the opaque shield equals approximately 0.5 seconds. It has been determined that such an opening time yields a good trade of between protection of the image sensor and picture quality.

In a typical embodiment, the sky monitoring device has maximum dimensions of 20 cm×15 cm×10 cm, preferably maximum dimensions of 10 cm×10 cm×10 cm. Such dimensions are advantageous because they lead to a flexible and easily transportable device while still providing enough space for the mandatory components.

In a typical embodiment, the microprocessor comprises a field-programmable gate array (FPGA) chip. Such an FPGA chip has the advantage of providing the possibility for high-level on-board calculations such as ray-tracing analysis and hardware acceleration while being available at comparably low cost. The use of such an on-board FPGA chip thus makes external computation means such as laptops unnecessary. In a particular embodiment, the FPGA chip is the microprocessor.

In a typical method for using a sky monitoring system according to the disclosure, the sky monitoring system is used for photo-realistic rendering and/or for lighting control and/or for solar position tracking and/or for solar intensity monitoring.

FIGURES

In the following, example embodiments of the disclosure are described in detail by means of drawings, wherein the drawings show.

DETAILED DESCRIPTION

In a preferred embodiment, the sky monitoring system is an embedded system integrating quasi real-time lighting computation with sky monitoring and luminance mapping, which can also be used in photo-realistic rendering, evaluation of lighting performance parameter and building automation. The embedded system comprises an SoC (system-on-chip) FPGA (field-programmable gate array) chip and a calibrated low-cost image sensor with a wide-angle lens. The embedded system is configured to employ the high dynamic range (HDR) technique to make the luminance detection range of the embedded system cover 7 orders of magnitude (121 cd/m$^2$ to 3×10$^9$ cd/m$^2$) including the sun, sky and environmental objects during daytime. The monitored luminance is mapped to 1.23 million sky patches and then the FPGA chip conducts the lighting computation based on ray-tracing, for example by means of the RADIANCE program. This lighting computation is carried out on board; in other words: the sky monitoring system is configured to conduct lighting computation by means of ray-tracing on board and/or without the use of external computation devices.

Figure 1:
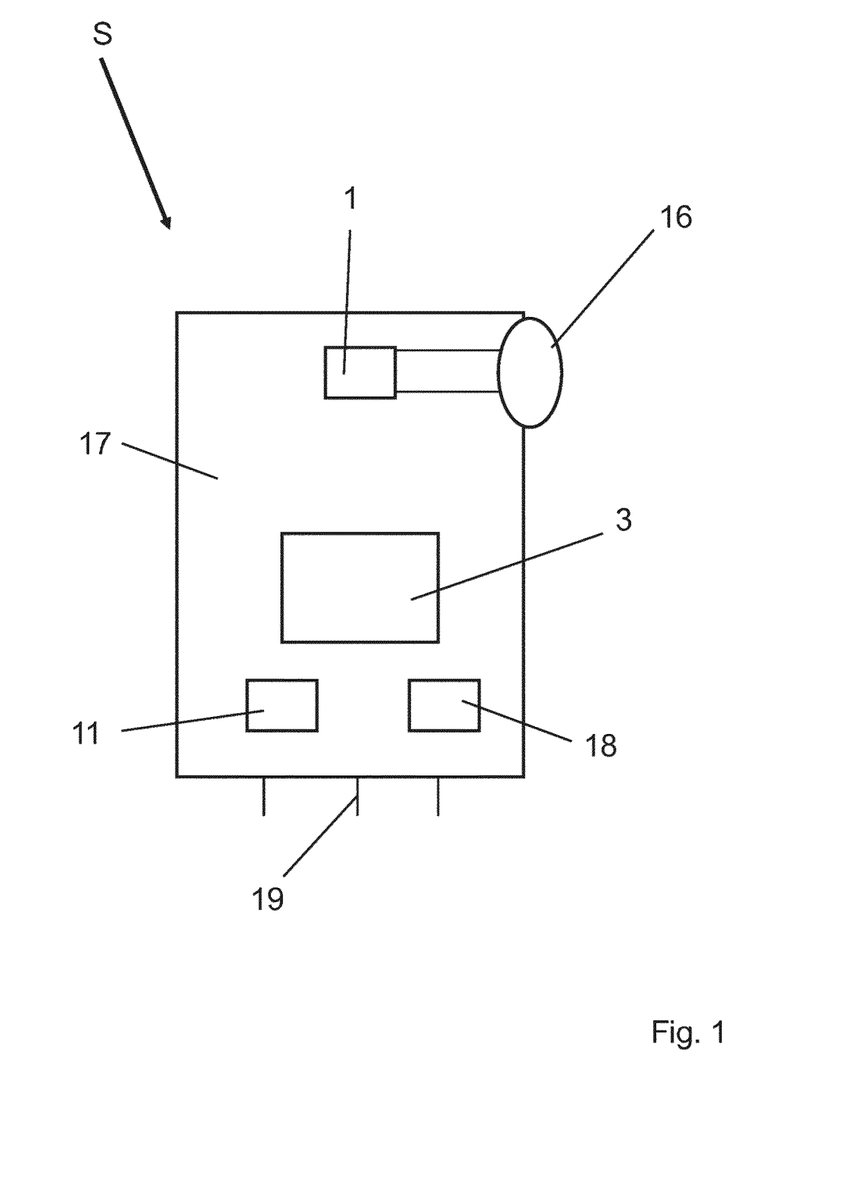
FIG. 1: a schematic block diagram of a sky monitoring system.

FIG. 1 shows a schematic block diagram of a sky monitoring system S according to the disclosure. The sky monitoring system S comprises an image sensor 1, a wide-angle lens 16 which is optically connected to the image sensor 1, a field programmable gate array (FPGA) chip 3, an internal memory 11, an SD memory 18 and several outputs 19. All these components are integrated on a printed circuit board (PCB) 17. All these components thus form a sky monitoring device which constitutes the sky monitoring system S. In other words: in this embodiment, the sky monitoring system S is an integrated sky monitoring device having all its components embedded on the PCB 17. The internal memory 11 and/or the SD memory 18 is preferably a 1 GB memory. FIG. 1 thus shows a highly integrated embedded sky monitoring system S independent of any external computation platform.

In the embodiment of the disclosure shown in FIG. 1, a low-cost digital image sensor 1 is employed as a major detector in this platform. The image sensor 1 comprises a 1/2.5 inch complementary metal oxide semiconductor (CMOS) image sensor featuring 5 million pixels (2592× 1944), 38.1 dB signal-to-noise ratio (SNR) and 12-bits analog to digital converter (ADC). This image sensor 1 is a low power consuming device with maximum power at 381 milli-Watts (mW). A wide operating temperature from −30° C. to 70° C. allows it to work in most geographical locations and seasons on earth.

The image sensor 1 is coupled with the wide-angle lens 16 of focal length at 2.5 millimeter (mm), ensuring that the field of view (FOV) of the sky monitoring system S covers a major area of a monitored sky dome and surrounding landscape. The reason why a wider-angle lens may not be employed in this particular embodiment lies in the consideration of keeping the distortion at a tolerable scale, as extreme wide-angle lenses tend to suffer from apparent radical and tangential distortions, which aggravates complexity in post-calibration. For the sky monitoring device in this embodiment, the imaging system spans a view angle of 129.8°×96.8° in horizontal and vertical directions, respectively, and the maximum is 162.5° in the diagonal direction.

In a preferred embodiment, a short-pass filter and a long-pass filter are placed between the wide-angle lens 16 and the image sensor 1 to correct its spectral response according to the CIE photopic luminosity function V(λ), thus making the image sensor 1 photometrically correct (f1' error 8.5%). The filters are not shown in FIG. 1.

In a preferred embodiment, the vignette and geometric distortions of the wide-angle lens 16 are measured and calibrated to ensure mapping accuracy.

In a further preferred embodiment, considering the extreme intensity of the solar rays, an opaque shield is positioned in front of the wide-angle lens 16 to protect the image sensor 1 from incoming solar rays (not shown in FIG. 1). Preferably, the opaque shield is controlled by a stepper motor to automatically open the opaque shield at the moment of image capturing and close the opaque shield again when the image capturing is finished. The maximum open time is preferably 0.5 seconds, thus securing that the image sensor 1 will not be overheated during this short period by the intensive direct solar rays, thus limiting the risk of irreversible physical damage to pixels of the image sensor 1.

In the embodiment shown in FIG. 1, the FPGA chip 3 and the 1-Gigabyte external SD memory 18 constitute a hub for logic control and computation. As an embedded system, its power dissipation, compactness and computing power are among the major concerns. Due to its highly customizable feature as an economical solution in non-recurring engineering, a single FPGA-SoC (system on chip) microprocessor is chosen to accomplish tasks including precise control of sensors and actuators, synthesis in HDR imaging, luminance mapping and on-board lighting computation. The FPGA chip 3 is for example an Altera Cyclone V chip.

Figure 2:
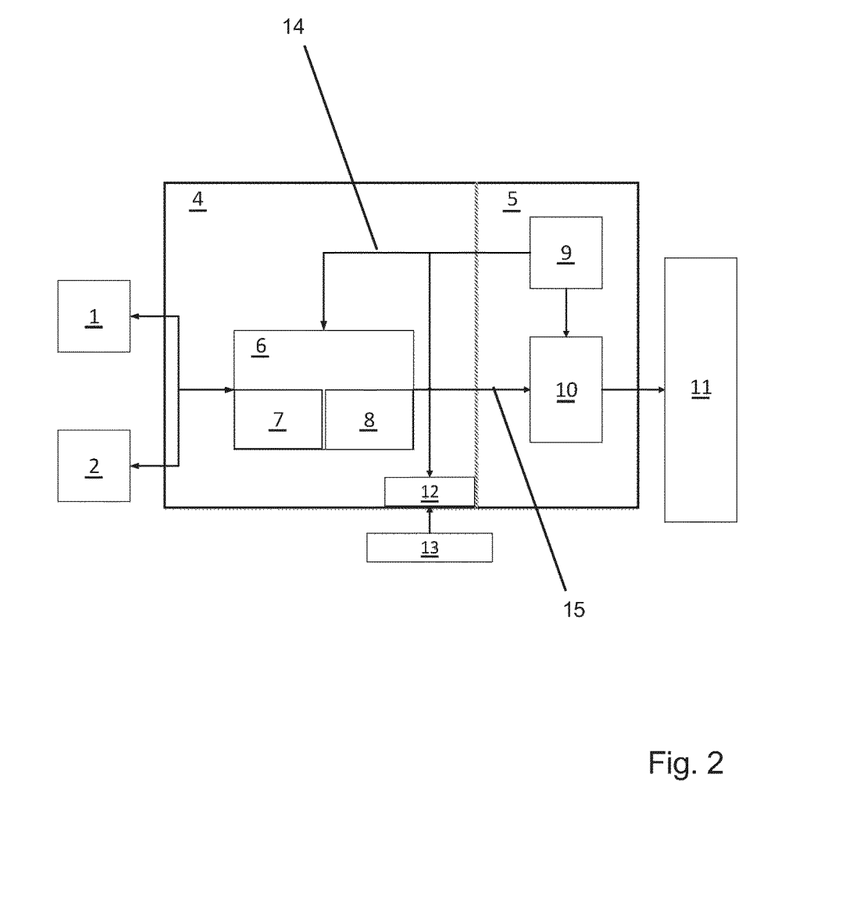
FIG. 2: a schematic block diagram of an FPGA microprocessor.

FIG. 2 shows in more detail the FPGA chip 3 already shown in FIG. 1. The FPGA chip 3 integrates two major parts on a single silicon die: a FPGA fabric part 4 and a hard core processor (HPS) part 5. The FPGA fabric part 4 is a massive area of programmable gate arrays (85K logic cells) preferable in parallel computing and control of sensors. In this embodiment, the FPGA fabric part 4 is limited to the control of image sensor 1 and stepper motor 2 for occluding the wide-angle lens 16 from the sky or the sun. The HPS part 5 is mainly composed of an ARM processing unit 9 (in particular an ARM Cortex-A9 dual core processor working at 925 MHz) together with communication bridges 14 to the FPGA fabric part 4. In this embodiment, the HPS part 5 is designed to be in charge of relatively high-level algorithms including the synthesis in HDR imaging, luminance mapping of the sky scene and lighting simulation.

FIG. 2 also shows that the FPGA fabric part 4 comprises a peripheral controller 6 with a hardware interface 7 and a computation accelerator 8. The peripheral controller 6 is connected to the image sensor 1 and the motor and actuator 2 of the opaque shield (not shown). The peripheral controller 6 is linked via a bridge 15 of the FPGA fabric part 4 to an SDRAM controller 10 of the HPS part 5. The SDRAM controller 10 is linked to the Memory (RAM) 11.

The FPGA fabric part 4 furthermore comprises an input/output interface 12, connected to the HPS part 5 via the communication bridges 14. The input/output interface 12 is connected to a multitude of buttons 13.

The FPGA fabric part 4 feeds the image sensor 1 with a high frequency clock operating at 96 MHz to drive a sequential output of pixels. Together with multiple internal counters, the processor is able to control the exposure time of the image sensor 1 ranging from 10 nanoseconds up to minutes. Based on the consideration of capturing images of rapid moving clouds, the maximum exposure time is typically limited to 400 milli-seconds (ms) to avoid blurring. As multiple clocks are working inside the FPGA chip 3, the minimum exposure time is typically set to be 1 microsecond (s) to reduce the effect of clock domain crossing (CSC), thus ensuring accuracy of minimum integration time.

Although the 12-bits ADC of the image sensor outputs 1 to 4096 levels of discrete gray-scale values, one embodiment of the disclosure filters out values outside the linear region of pixels and keeps only 50 to 3400 to be the valid range, at the same time, excluding dark current noise and reset noise of the sensor. In this way, the brightest pixel receives 64 times more photons than that of the dimmest pixel on the same frame. In a preferred embodiment, five consecutive frames are taken with exposure times of 1 µs, 10 µs, 655 µs, 42 ms and 400 ms, respectively. The synthesized luminance spans 7 orders of magnitude (150 dB). This is sufficient to cover the range of luminance of the direct solar rays ($3 \times 10^9$ cd/m$^2$) and that of environmental objects (121 cd/m$^2$) in daytime.

In a preferred embodiment, every four pixels of RGB channels are merged as a group, and the device is thus able to output 1.23 million cells of luminance values, wherein each cell corresponds to a unique directional angle of an incident ray. Therefore, it is possible to map the luminance values from the image plane to 1.23 million patches of the sky or ground dome. As the focal length of the wide-angle lens 16 is infinitesimal compared to the distance between the sky monitoring device and environmental objects (such as neighboring buildings, gardens and static vehicles), it is possible to approximate both ambient objects and the sky to be at infinite distance from the wide-angle lens 16 and virtually immerse the environmental objects into the infinite sky and ground dome, regarding them, including clouds and the sun, to be one integrated entity in mapping.

The microprocessor of the sky monitoring system in the embodiment shown in FIGS. 1 and 2, namely the FPGA chip 3, is able to accomplish the control of HDR imaging and luminance mapping within one second. The mapped luminance of the sky and objects is stored in a calculation file as input to the RADIANCE in lighting simulation, this simulation running on board the sky simulation device S. For the lighting computation of a room with unilateral facades, one half of the sky hemisphere that the window is facing towards induces as the source of lighting, together with one half of the ground hemisphere with ambient objects. In the light of this, one hemisphere of the sky and ground dome, in sum, faced by the facade of the room is sufficient for luminance monitoring and lighting simulation for a scene with a unilateral facade. Therefore, the sky monitoring device can be positioned in front of the window glazing of the room to perform the monitoring and lighting computation, ensuring the axis of lens aligned in the same direction as that the window glazing is facing towards, as shown in FIG. 3.

Figure 3:
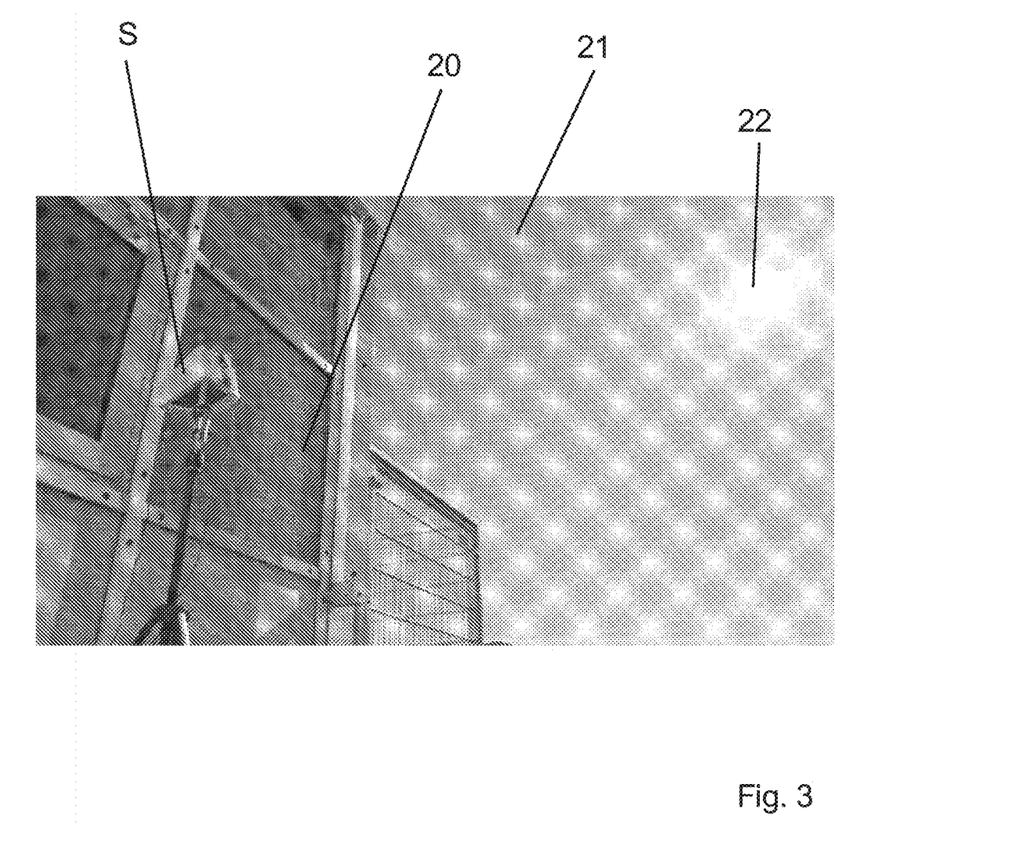
FIG. 3: a sky monitoring system installed outside the window of a building and facing the sky.

FIG. 3 shows a sky monitoring system S in the form of an integrated sky monitoring device mounted outside a building in front of one of the building's window 20. The sky monitoring system S is directed to the sky 21, so as to take pictures of a sky scene, typically including at least parts of the sky and ground dome. In the particular embodiment shown in FIG. 3, the sky 21 is a clear sky and comprises a sun 22.

In a preferred method for using the sky monitoring device S, the RADIANCE program is employed to compute the lighting in an office room, based on back-ward ray tracing algorithm. A scene of an office is first created and then the microprocessor, for example the FPGA chip 3, synthesizes a monitored luminance of the sky and ground half-hemisphere (also referred to as the sky scene) together with the scene of the office room into an octree file, which is taken as an input for lighting computation. Afterwards, the rtrace and rpict, sub-programs of RADIANCE, operate on the HPS part 5 of the FPGA chip 3 to generate the rendering and calculate the illuminance distribution inside the room.

Figure 4:
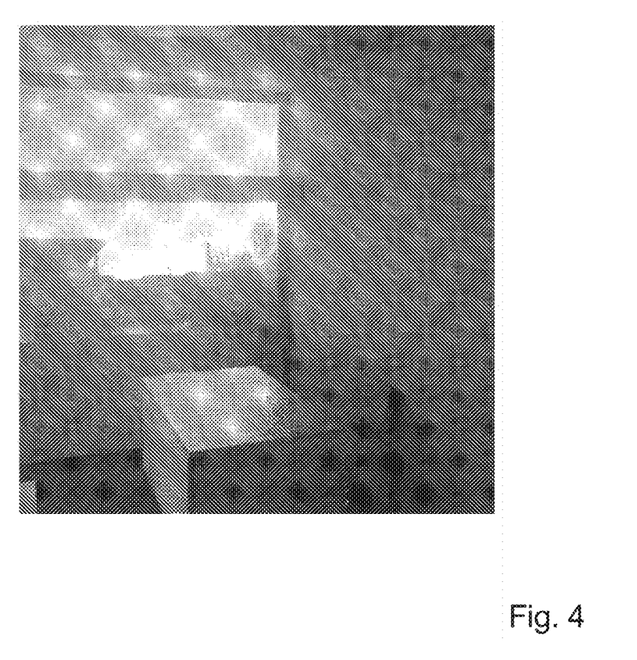
FIG. 4: a photo-realistic rendering of a reference office room created by a sky monitoring system.

FIG. 4 visualizes the rendering of a reference office on a sunny day, with monitored luminance of the sky, the sun and ambient objects as input. The contour of the surrounding buildings and trees exhibits clearly on the rendered image from a viewpoint inside the room facing towards outside, due to high resolution mapping. As only photometric quantity gets involved, the color of light source is ignored and thus the sky and surrounding landscape appear grey. For tracing $1.41\times10^6$ rays, it has been discovered that it takes 79.2 seconds to accomplish the rendering on the HPS part 5 of the sky monitoring system's processor, for example the FPGA chip 3, with 1.23 million mapped sky or ground patches as input.

The embedded sky monitoring device according to the disclosure, positioned outside a room and facing towards the sky, can also be used in the lighting estimation of an intra-scene for lighting control. In simple words: for example, the sky monitoring system S shown in FIG. 3 can be used to take pictures of a sky scene outside the room and can calculate a current lighting situation inside the room, for example an illuminance distribution on a workplane inside the room. This illuminance distribution can then be used for lighting control, for example for automatically switching on electric lighting in case the illuminance levels in a certain area of the workplane become too low. This means that the lighting control is being carried out based on the simulation results furnished by the sky monitoring system S and not by actual measurements by means of luxmeters.

Due to its fast speed HDR imaging technique and spectrum response calibration, the embedded sky monitoring device shows its capability in precise detection of solar luminance and tracking of solar position. The sky monitoring device can be used for example for measuring the luminance, azimuth and zenith angle of the sun, which can be potentially applied in the automation of solar PV panels in aligning its angular position according to the sun to maximize its power generation.

The following advantages are at least partially reached by the disclosure:

The sky monitoring system S is compact in size and independent of external computation platform such as a personal computer (PC) or servers. The embedded system alone is able to accomplish all the functionality.

Wide dynamic range when monitoring the luminance of the direct solar rays and ambient objects in shadow during daytime.

High resolution for glare detections and the accuracy of lighting simulation is ensured.

Integration of luminance measurement and lighting simulation together.

Precise measurement of the angular position of the sun in real-time.

The disclosure has at least the following fields of application:

Use as a luminance meter, with high resolution of $10^{-7}$ sr in solid angle, covering high dynamic range including the luminance of the sun ($1.6\times10^9$ cd/m$^2$) and that of ambient objects (10-100 cd/m$^2$) at the same time, quick response in seconds.

Real-site simulator of lighting of a room for architecture designers. The device could be put at the position of an unconstructed building or in front of the window of a room needed to be refurbished. With real environmental objects and the sky as input, it is able to simulate the lighting conditions for the design of the interior of the building or rooms on real-site. The device can also generate images for users to visualize the lighting condition and help designers to analyze/evaluate the lighting intensity levels (daylighting performance) and whether they meet particular requirements.

Application in building control. As a compact and responsive device, it can be installed on the building to monitor the real conditions of the sky and ambient objects and, according to the results of the quasi real-time lighting simulation, it can help control the shading of a building to maintain the illuminance in rooms at a certain level.

Real-time control of solar photovoltaic systems, for example to align their position according to the sun position.

The disclosure is not limited to the preferred embodiments described here. The scope of protection is defined by the claims.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

REFERENCE LIST

1 Image sensor
2 Motor and actuator
3 Field Programmable Gate Array (FPGA) chip
4 FPGA fabric part of the FPGA chip
5 Hard core processor (HPS) part of the FPGA chip
6 Peripheral controller
7 Hardware interface
8 Computation accelerator
9 ARM processing unit
10 SDRAM controller
11 Memory (RAM)
12 Input/output interface
13 Buttons
14 Bridge of HPS to FPGA fabric
15 Bridge of FPGA fabric to SDRAM controller
16 Wide-angle lens
17 Printed circuit board (PCB)
18 SD Memory
19 Outputs
20 Window of a building
21 Sky
22 Sun
S Sky monitoring system

The invention claimed is:

1. A sky monitoring system, comprising:
an image sensor,
a wide-angle lens positioned relative to the image sensor to direct light thereto,
a microprocessor communicatively coupled to the image sensor, and a memory unit communicatively coupled to the microprocessor, wherein the image sensor, the wide-angle lens, the microprocessor, and the memory unit are integrated into one single sky monitoring device, and wherein a spectral response of the image sensor is corrected according to a CIE photopic luminosity function $V(\lambda)$, wherein the microprocessor, using the memory unit, is configured to:

capture a plurality of pictures of a sky scene;

subdivide each of the plurality of pictures of the sky scene into a group of patches, wherein each patch corresponds to a unique incident angle of observed light rays from the sky;

determine a luminance value for each of the patches;

calculate an output based on the luminance values of the patches; and supply as the output an illuminance map of a surface inside a building.

2. The sky monitoring system of claim 1, wherein the image sensor is a CMOS image sensor, wherein the CMOS image sensor comprises between 3 million and 7 million pixels, wherein the CMOS image sensor features a signal-to-noise ratio between 20 dB and 60 dB, wherein the CMOS image sensor preferably features a 12-bits analog-to-digital converter, wherein the CMOS image sensor is preferably adapted to operate between −40° C. and 80° C.

3. The sky monitoring system of claim 1, wherein the wide-angle lens has a focal length between 1 mm and 4 mm.

4. The sky monitoring system of claim 1, wherein a short-pass filter and a long-pass filter are arranged between the wide-angle lens and the image sensor.

5. The sky monitoring system of claim 1, further comprising an opaque shield positioned between the wide-angle lens and a sun; and a motor, wherein the opaque shield is movable between an open position and a closed position, wherein the microprocessor, using the memory unit, further is configured to:

move the opaque shield to the open position at a moment of image capturing; and then, move the opaque shield to the closed position in order to shield the lens and the image sensor from the sun.

6. The sky monitoring system of claim 1, wherein the sky monitoring device has maximum dimensions of 20 cm×15 cm×10 cm.

7. The sky monitoring system of claim 1, wherein the microprocessor comprises a field-programmable gate array chip.

8. The sky monitoring system of claim 1, wherein the microprocessor, using the memory unit, further is configured to do at least one of the following:

supply as the output a current sky condition;
supply as the output a current solar intensity; or
supply as the output a current solar position.

9. The sky monitoring system of claim 1, wherein the microprocessor is configured generate the illuminance map of the surface inside the building based on a backward ray-tracing algorithm.

10. The sky monitoring system of claim 1, wherein the microprocessor outputs the illuminance map of the surface inside the building based on (i) a monitored luminance of the sky and ground half hemisphere, and (ii) the scene of the office room.

11. The sky monitoring system of claim 1, wherein the calculation comprises ray-tracing analysis.

12. A method of using a sky monitoring system, comprising:

capturing, via an image sensor of the sky monitoring system, a plurality of pictures of a sky scene using a sky monitoring device;

correcting a spectral response of the image sensor according to a CIE photopic luminosity function $V(\lambda)$;

subdividing, using a microprocessor, each of the plurality of pictures of the sky scene into a group of patches, wherein each patch corresponds to a unique incident angle of observed light rays from the sky;

determining a luminance value for each of the patches;

calculating an output based on the luminance values of the patches; and supplying as the output an illuminance map of a surface inside the building.

13. The method of claim 12, further comprising at least one of:

performing photo-realistic rendering using the output;
controlling lighting using the output;
solar position tracking using the output; or
monitoring solar intensity using the output.

14. The method of claim 12, wherein the image sensor is a CMOS image sensor, wherein the CMOS image sensor comprises between 3 million and 7 million pixels, wherein the CMOS image sensor features a signal-to-noise ratio between 20 dB and 60 dB, wherein the CMOS image sensor preferably features a 12-bits analog-to-digital converter, wherein the CMOS image sensor is preferably adapted to operate between −40° C. and 80° C.

15. The method of claim 12, wherein a short-pass filter and a long-pass filter are arranged between the wide-angle lens and the image sensor.

16. The method of claim 12, wherein the sky monitoring system has maximum dimensions of 20 cm×15 cm×10 cm.

17. The method of claim 12, wherein sky monitoring system comprises a microprocessor and a memory unit.

18. The method of claim 12, wherein the illuminance map of the surface inside the building is based on a backward ray-tracing algorithm.

19. The method of claim 12, wherein the illuminance map of the surface inside the building is based on (i) a monitored luminance of the sky and ground half hemisphere, and (ii) the scene of the office room.

20. The method of claim 12, wherein the calculation comprises ray-tracing analysis.

* * * * *